United States Patent [19]

Meier

[11] Patent Number: 5,277,732
[45] Date of Patent: Jan. 11, 1994

[54] PROCESS FOR THE PRODUCTION OF A HONEYCOMB CORE FROM FOIL STRIP UTILIZING A POSITION DETECTOR

[75] Inventor: Johannes Meier, Neuhausen, Switzerland

[73] Assignee: Alusuisse-Lonza Services Ltd., Zürich, Switzerland

[21] Appl. No.: 919,950

[22] Filed: Jul. 27, 1992

[30] Foreign Application Priority Data

Aug. 5, 1991 [CH] Switzerland .......................... 2315/91

[51] Int. Cl.⁵ ................................................. B31D 3/02
[52] U.S. Cl. ................................. 156/197; 156/222; 156/260; 156/270; 156/291; 156/353; 156/512
[58] Field of Search ............... 156/197, 259, 260, 264, 156/290, 363, 364, 512, 222, 270, 291, 353

[56] References Cited

U.S. PATENT DOCUMENTS

| | | | |
|---|---|---|---|
| 2,649,131 | 8/1953 | Lincoln | 156/459 |
| 3,637,448 | 1/1972 | Siegal et al. | 156/197 |
| 4,500,380 | 2/1985 | Bova | 156/510 |
| 5,015,317 | 5/1991 | Corey et al. | 156/197 |

Primary Examiner—Michael W. Ball
Assistant Examiner—Richard Crispino
Attorney, Agent, or Firm—Bachman & LaPointe

[57] ABSTRACT

Process an equipment for the production of an expanded honeycomb core from strips (10) coated at uniform intervals with strips of adhesive (6), in which the strips (10) with their adhesive strips (6) parallel and in staggered positions are stacked on top of one another and adhesively bonded together under pressure and if necessary at an elevated temperature, the stack (40) so formed being subsequently expanded, consists in the following: a strip (10) passes over a position detector (24), which from the adhesive strips (6) determines its position relative to a first end (P) of a stack (40), and which controls a positioning drive (25) and a cutting device (26). The positioning drive (25) positions the strip (10) relative to the stack (40) at its end (P), and the strip (10) is held fast. Beginning from end (P), the strip (10) is progressively bonded in the direction of the other end (Q) to the previously stacked and underlying strip (10') in such a way that the adhesive strips (6) on strip (10) lie in-between those on the underlying strip (10'). Shortly before being bonded at the other end (Q), the strip (10) is cut by the cutting device (26) to a predetermined length limited by the ends (P, Q), which determines the desired width of the honeycomb core to be produced. The process is then repeated.

11 Claims, 8 Drawing Sheets

PROCESS FOR THE PRODUCTION OF A HONEYCOMB CORE FROM FOIL STRIP UTILIZING A POSITION DETECTOR

BACKGROUND OF THE INVENTION

The invention concerns a process for the production of an expanded honeycomb core from foil band unwound from a band roll, coated with uniformly spaced strips of adhesive, and cut into strips in the direction of unrolling; the strips are piled on top of one another with their adhesive strips in a staggered arrangement, and are then adhesively bonded together under pressure. Subsequently the stack is expanded. The invention also concerns equipment for carrying out the process, and the use of the honeycomb core for the continuous production of a composite plate.

In the process conforming to GB-A-1 602 778 for the production of a honeycomb core, the foil is coated with strips of adhesive after unwinding from the band roll and longitudinally, i.e. in the direction of its unwinding. Then, a second foil treated in the same way is unwound from a second band roll and bonded to the first foil under pressure. Subsequently, from this intermittently produced, now two-layered foil band, strips of equal width are cut transversely to the unwinding direction, the width corresponding to the desired height of the honeycomb core. The strips are stacked with their adhesive strips staggered, bonded under pressure, and finally expanded.

In a similarly known process sheets are cut from the foil after unrolling from the band roll by cutting transversely to the unrolling direction. These are stacked with the adhesive strips applied in the unrolling direction in a staggered arrangement, and adhesively bonded under pressure. From the stacks so formed, strips of a width corresponding to the desired honeycomb core height are once again cut in the direction transverse to the direction of unwinding from the band roll, and these are further processed in the same way as in the previously described process.

To obtain accurate final dimensions of the honeycomb core, in both processes finishing machining by milling or similar is needed.

The honeycomb cores produced by these known processes have a honeycomb core width predetermined by the width of the foil bands and a honeycomb core length limited by the restricted number of strips or sheets to be stacked together. The band width amounts at most to about 180 cm, since wider foil bands are not obtainable, so that honeycomb core widths of only less than about 150 cm can be made. Moreover, particularly because of the need to ensure accuracy of the honeycomb core height by a separate machining operation such as milling or similar, the production is expensive and uneconomical because the above-mentioned cutting of the strips is not sufficiently accurate, since at the places where the adhesive is situated, the width of the strip packs is always narrower than at other points. In addition, from U.S. Pat. No. 3,655,475 a honeycomb core production process of the same general type is known, in which the foil width amounts to something more than twice the height of the eventual honeycomb core. The foil is coated on one side with evenly spaced adhesive strips transverse to the longitudinal direction, but with the outer zones and the middle of the foil free from adhesive. The adhesive strips are so arranged that there are strips over one-half of the foil width, while over the other half there are also strips, but in staggered positions with respect to those on the first half. The edge zones and the middle of the foil are free from adhesive strips. At one edge of the foil and close to the middle, but on the side opposite the edge in question, local precisely arranged perforations are made in the direction of unwinding and at the same height. The foil is then cut in the middle. The two resultant foil strips are then passed through an arrangement of rollers in such a way that they come to be positioned over one another with their adhesive strips in the same orientation, i.e. the front side of one foil strip lies against the back side of the other. To do this, the perforations are used to position the two strips so that the adhesive strips on one lie accurately half-way between those of the other. The pairs of strips are then stacked, bonded under pressure, and released by trimming off the adhesive-free edges.

Though, in contrast to the previously described processes, this procedure has the advantage of producing honeycomb cores of any desired width in principle, it suffers from the essential disadvantage that the trimming operation results in higher wastage of foil material. Moreover, as in the previous cases, this additional machining makes it impossible to produce accurate final dimensions, for reasons already explained.

It is also known for honeycomb cores of the described type in the expanded condition to be joined together with covering layers on both sides, to form a composite material characterized by light weight and comparatively high strength. However, hitherto it has only been possible to produce such composites one piece at a time. Yet, there is a need to have stocks of a cheap honeycomb core with accurate final dimensions in a form that will allow the continuous production of composite plates. This necessitates at least a one-piece honeycomb core of practically any desired length.

SUMMARY OF THE INVENTION

Thus, the invention is based upon the task of creating a process for the production of a honeycomb core which will supply a honeycomb core of practically any desired dimensions with a very accurate honeycomb height, cheaply, and with the fullest possible utilization of the foil material, i.e. with practically no waste, and to propose equipment for carrying out the process in question. Furthermore, the honeycomb core should enable the continuous production of composite plates.

In accordance with the invention, the task set is solved by a process and equipment as set forth herein.

The present invention comprises a process for the production of an expanded honeycomb core from foil band unrolled from a band coil, which is coated at uniform intervals with strips of adhesive and cut into strips in the direction of uncoiling, the strips then being piled on top of one another with their respective adhesive strips parallel but in staggered positions, and thereafter adhesively bonded together under pressure to form a stack with ends which is finally expanded, characterized in that the foil band is cut into strips whose width corresponds to the honeycomb core height desired; one strip is passed over a position detector which, by detecting the adhesive strips, determines its position relative to the first end of the stack and activates an electronic control unit to control a positioning drive and a cutting device; the positioning drive positions the strip relative to the stack at its end in such a way that the adhesive strips on the strip lie between those of the underlying strip and strip is held fast at the end; beginning from the end, the strip is then progressively bonded to the underlying strip, working towards the direction of the other end; shortly before bonding at the other end, the strip is cut by the cutting device to a preselected length limited by the ends, which corresponds to the desired width of the honeycomb core to be made; the process then repeats itself.

The process of the invention is applied in accordance with the invention for the continuous production of a composite plate with an expanded honeycomb core and at least one covering layer.

A particular advantage is that by appropriate selection of the ratio between the strip width and the foil band roll width transverse to the unrolling direction, the process of the invention enables the foil to be cut into strips without any waste at all.

The strips, which can be accurately cut to the size of the honeycomb core height in familiar ways and without any special difficulty or expense, are transferred to intermediate storage before further processing. It is appropriate to do this by winding the strips onto strip spools, and later, in accordance with the process, unrolling them, stacking them in a staggered arrangement, bonding them under the action of elevated temperature and a pressing force, and finally cutting to the desired length transversely to the direction of unrolling.

A further advantage of the process conforming to the invention is that practically any desired honeycomb core width can be obtained, because the strips are unrolled from the strip spools and can be cut to practically any freely chosen length corresponding to the desired honeycomb core width, cutting transversely to the unrolling direction. Once pressed together, the stack obtained can be transferred to intermediate storage, which minimizes the cost of storage space, or it can be expanded immediately after pressing. Thus, using the process of the invention, if necessary with the equipment of the invention, to carry out the process in question, honeycomb cores of practically any desired dimensions can be produced continuously. A continuously produced honeycomb core produced in this way can advantageously be used for the continuous production of a composite plate with the expanded honeycomb as its core and at least one covering layer.

BRIEF DESCRIPTION OF THE DRAWINGS

Further features of the invention are described below with reference to the schematic drawings. These show, by way of examples, in.

DETAILED DESCRIPTION OF THE PREFERRED EMBODIMENTS

Figure 1:
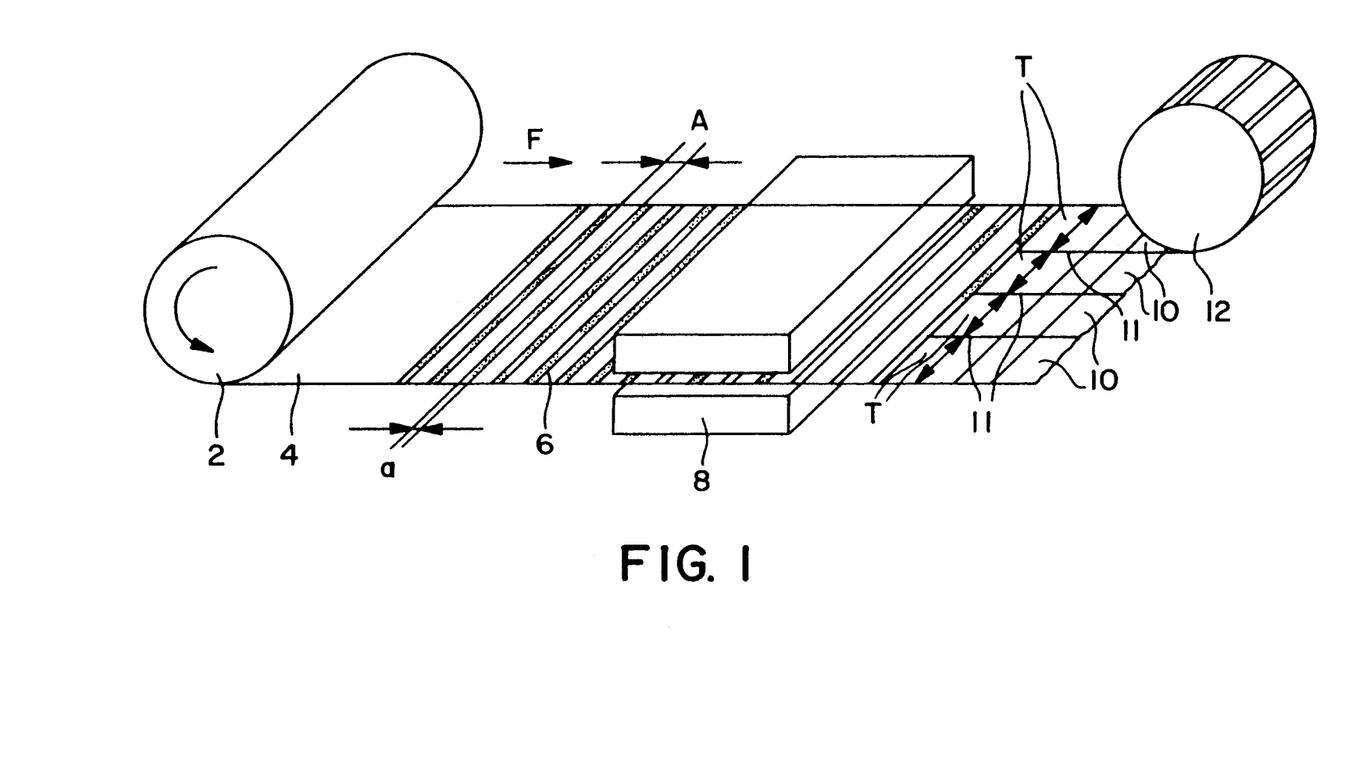
FIG. 1—a perspective view of the production of the strips from a band of metal foil, FIGS. 2a, 2b—a perspective view and a side view of the staggered arrangement of the adhesive strips, the stack and the strips, FIGS. 3a, 3b—perspective views of a section of an expanded honeycomb core and an individual cell from it, FIG. 4—a design example of the equipment for producing the honeycomb core, in side view, FIG. 5—a section A—A through FIG. 4 showing further details, FIGS. 6, 7—further design examples of equipment for the production of a honeycomb core, in side view, and FIG. 8—the application of the honeycomb core for the continuous production of a composite plate.

According to FIG. 1 a metal foil 4 is unwound from a coil 2 in the direction of the arrow F and coated with strips of adhesive 6 at uniform intervals A lying transversely to the unrolling direction. The adhesive strips 6 may, for example, be dried at a drying station 8. They adhere firmly to the foil 4, but show no tendency to stick on further surface contact with more of the metal foil. By means of a cutting tool (not shown) the foil 4 is cut at 11 into strips 10 of equal width T. These are rolled onto strip spools 12 and sent for storage. It is advantageous to choose the width of the metal foil band 4 and the width T of the strips 10 such that there is no waste when the foil 4 is cut up into strips 10. Obviously, strips 10 of any desired length can be cut and rolled onto the strip spools 12.

Figure 2A:
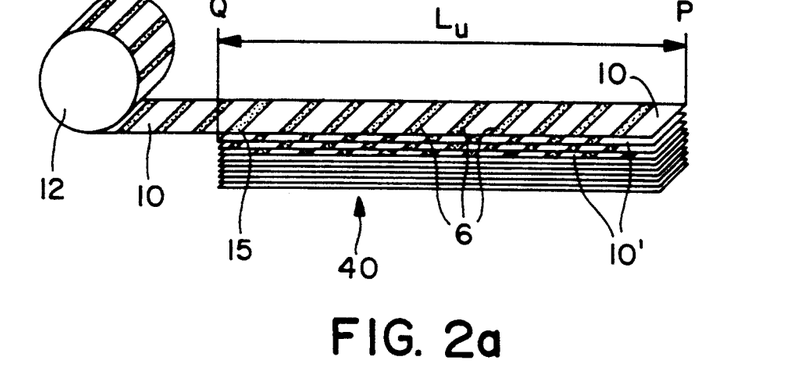

As shown in FIG. 2a, a piece of the strip 10 is unrolled from a strip spool 12 and positioned on top of the topmost strip of a stack of strips 10' in such a way that the adhesive strips 6 on the strip 10 are staggered with respect to those on the topmost strip of the stack 10', preferably so that the adhesive strips 6 of strip 10 lie exactly in the middle of the adhesive-free gaps of the topmost strip of the stack 10'. The strip 10 is then cut to the desired length $L_u$ at 15. Several repetitions of this procedure produce a cut stack 40 with the adhesive strips 6 on successive strips staggered in alternation. Then the strip 10 or the individual stack strips are bonded by the adhesive strips 6 to the stack strips in contact with them, under pressure and depending on the adhesive used, at an elevated temperature as well if necessary. For preference, the adhesive used should be a melting adhesive which requires the action of elevated temperature to bond the strips together. In its pressed condition, the stack 40 can now be stored.

Figure 2B:
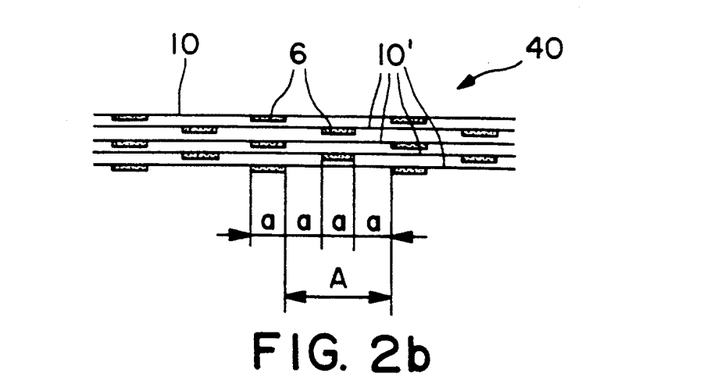
Figure 3A:
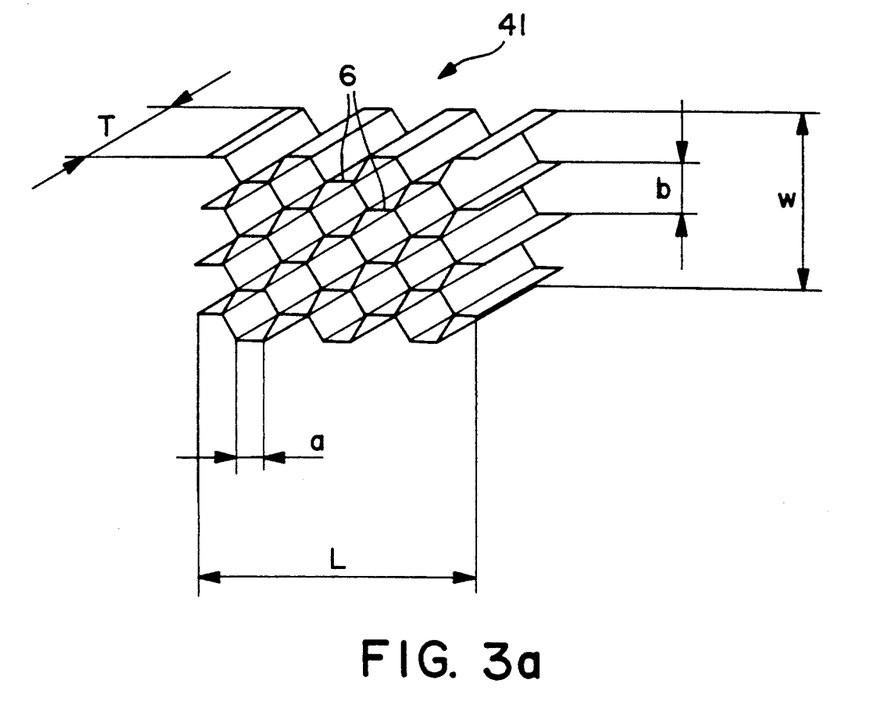
Figure 3B:
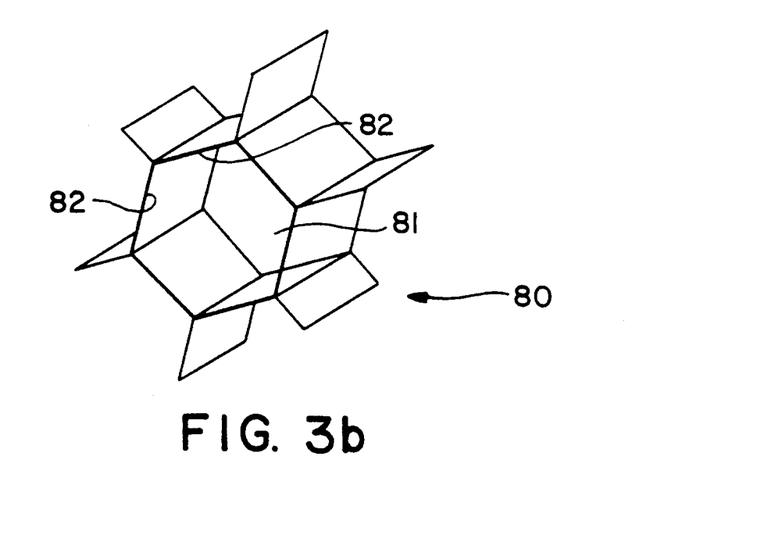

If, as shown in FIG. 2b, the adhesive strips 6 of uniform width a are so arranged that the adhesive-free intervals A are three times as wide as a, i.e. A=3a, and if the individual strips are stacked in the preferred way described above, then when the stack 40 is expanded a honeycomb core 41 with hexagonal cells will be formed, as shown in FIG. 3a. FIG. 3b shows an individual hexagonal cell 80. When the stack 40 is expanded its width, originally equal to the strip length $L_u$, is reduced to a value L. The length W of the honeycomb core depends upon the number of strips in the stack, and can therefore be chosen at will. This enables the continuous production of composite plates 90 with expanded honeycomb cores 41 and a covering layer 42 on at least one side, in that for example the stack 40, still pressed together, can be retrieved from intermediate storage and used for the continuous production of composite plate, as described in detail later on with reference to FIG. 8.

Figure 4:
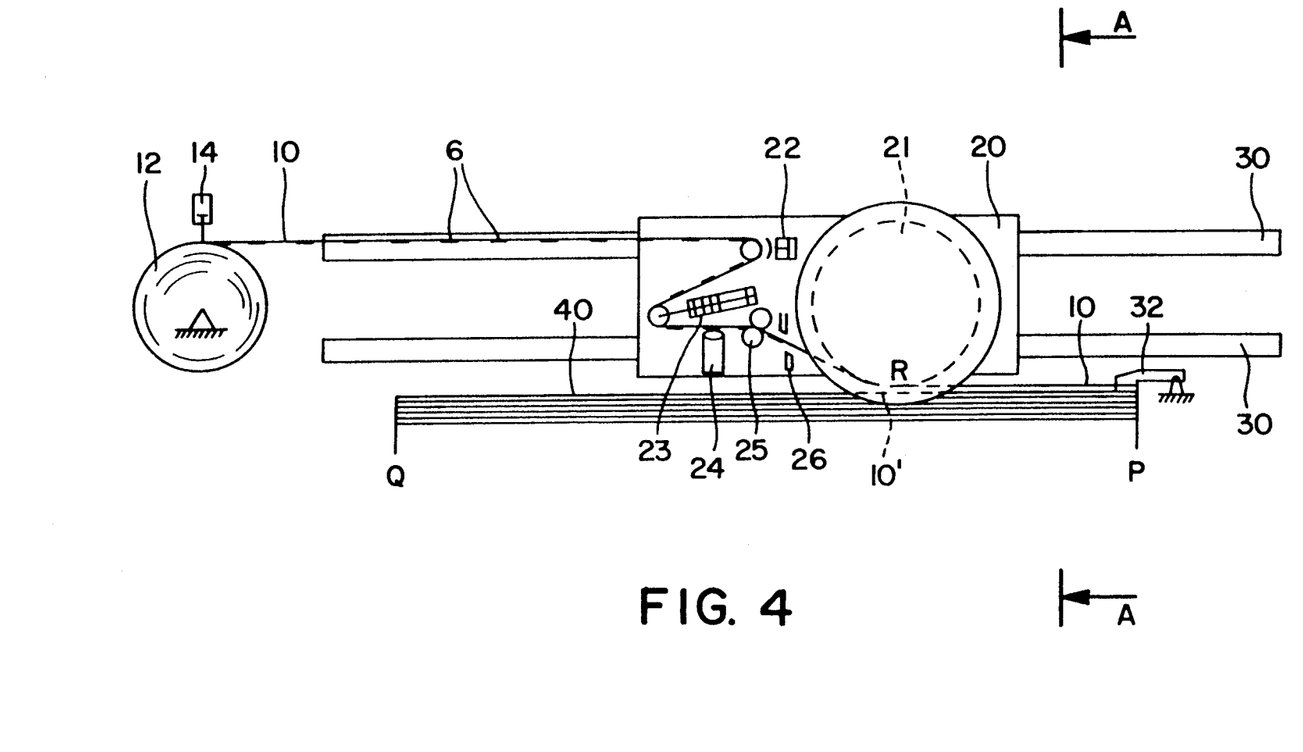

The device pictured in FIG. 4 can be used to bring about the staggered positioning of the adhesive strips 6 on the stack 10' and the strip 10. A sliding carriage 20 is mounted on guideways 30 that allow it to move. The carriage 20 carries a position detector 24, a positioning drive 25, a cutting device 26 and a liftable sealing roller 21 for bonding the strip 10 to the topmost strip of the stack of strips 10'. The mobility of the carriage 20 is such that the sealing roller 21 with its low-point R can travel along the entire width $L_u$ of a honeycomb holder device 60 in which the strips are held together in a stack 40, i.e. at least between the end-points P and Q. At one end P of the cut stack 40 is a clamp 32 for holding the strip 10 fast. The sealing roller 21 can be lifted vertically and can preferably also be heated. As it moves under control between the ends P and Q and over strip 10 and at least the topmost strip of the stack 10', if necessary being heated at the same time, it exerts a uniform pressure whereby the strip 10 becomes adhesively bonded to the topmost strip of the stack 10'. As already mentioned, the heating is necessary in the case of adhesives which become effective only after heating or at elevated temperatures.

A strip 10 is unwound from the strip spool 12 and control and the position detector 24 accurately determines the position of its adhesive strips 6. The adhesive strips 6 serve at the same time as benchmarks for the staggered positioning of the strip 10 relative to the topmost strip of the stack 10'. The positioning drive 25 now pushes the strip 10 a distance under the clamp 32 such that its adhesive strips 6 are displaced exactly an amount 2a away from those of the underlying strip. The clamp 32 holds the strip 10 fast in this position. This position then determines that of the next strip to be stacked on top. Before, during or after the positioning of the strip 10, the sliding carriage 20 moves in the direction of the end P until the low point R of the sealing roller 21 is over the end P, when the sealing roller 21 is lowered and exerts pressure upon the strip 10 or the stack 40, if necessary while being heated at the same time. With the sealing roller 21 in the lowered position, the sliding carriage 20 moves towards the other end Q until its low point R reaches that end. Shortly before this happens, the cutting device 26 is used to cut the strip 10 to its preselected length $L_u$ limited by the ends P and Q, which depends on the desired width L of the honeycomb core 41 to be made. This pressure and heat transfer process bonds the strip 10 to the topmost strip of the stack 10'. The strip 10 has now become part of the cut stack 40, namely its topmost strip. The entire process is then repeated from the beginning, i.e. starting with the detection of the position of the adhesive strips 6 on the new strip 10 from the strip spool 12 and conveyance of the strip to end P. Continual repetition of these processes produces a continually growing cut stack 40, which leads to an expanded honeycomb core 41 of practically any desired length W and width L.

Figure 5:
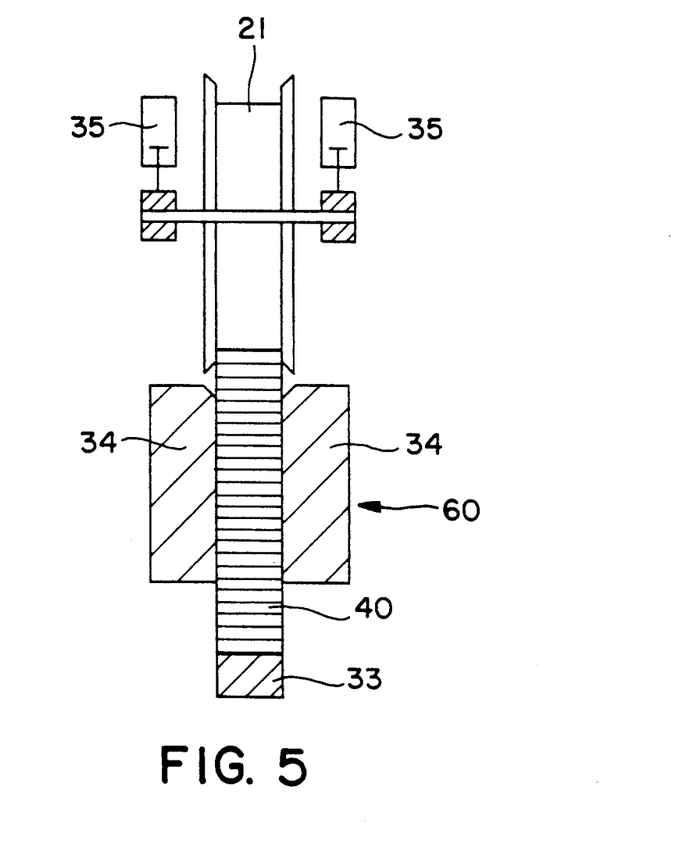

FIG. 5 shows the section A—A from FIG. 4 in greater detail. The honeycomb holder device 60 and the sealing roller 21 are shown. The honeycomb holder 60 consists of a sinking table 33 and clamp jaws 34. With the aid of a pressure cylinder 35, the sealing roller 21 presses down upon the stack 40 lying on the sinking table 33. The plane of the table 33 runs parallel to the movement direction of the sliding carriage 20, but it is only needed in the early stages of carrying out the process by means of this equipment. As soon as the repeated bonding of the strips has built up a stack 40 of a certain height such that the clamping jaws 34, which can be moved in and out by a force transverse to the pressing direction of the sealing roller 21, can be pressed against the stack 40, the table 33 is no longer needed. The clamping jaws 34 pressed against the stack 40 then hold the latter in position by themselves so that the pressing force of the sealing roller 21 can act upon the stack 40 or the strip 10 and the topmost strip of the stack. As the process progresses, the height of the stack 40 increases. To guarantee a constant pressure by the sealing roller 21, the pressure exerted by the pressure cylinder 35 is reduced in a controlled way and/or the stack 40 is gradually lowered by loosening the clamping jaws 34 (not shown). In the early stages the table 33 can also be used for this lowering.

Figure 6:
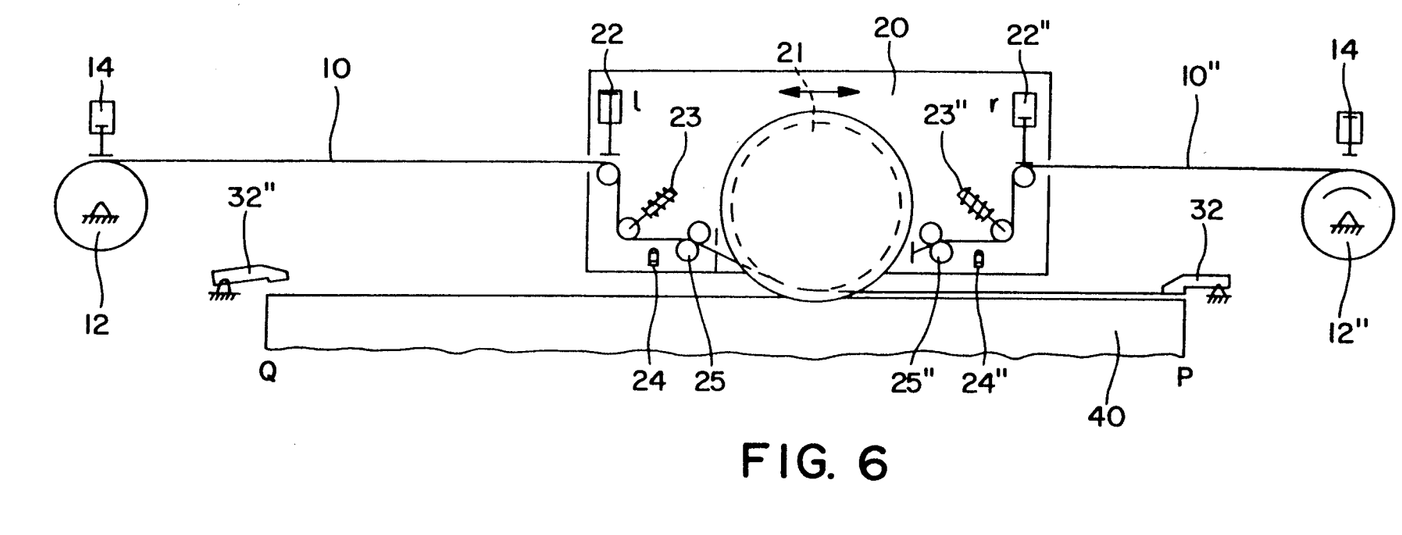

In the procedure described so far using equipment as illustrated schematically by FIG. 4, as the sliding carriage 20 moves repeatedly, for example, from the end Q to the end P and back to the original end Q, the sealing roller 21 performs an active function only during half of this movement, as described, namely only during its movement from P to Q. To utilize the sealing roller 21 actively throughout its motion and thus increase the efficiency of the equipment, a mechanism as shown in FIG. 6 is provided. At least the necessary aggregates 24, 25 mounted on the sliding carriage 20 and described earlier, are now fitted on it in duplicate. Seen from the middle of the carriage, they are arranged each on one side 1 or r in mirror-image formation. The left-hand side 1 is used when bringing in the strip 10 from the strip spool 12. Associated with this is the clamp 32 at the end P. The right-hand side r is used when bringing in the strip 10" from the strip spool 12". Associated with this side r is the clamp 32" at the end Q. As the carriage moves in the described way, while exerting pressure and if necessary at an elevated temperature, over the stack 40 or the overlying strip 10 and from end P to end Q, the carriage also takes up the strip by means of the same aggregates arranged on the right-hand side r and positions it at end Q in a manner analogous to the previously positioned strip 10. After raising the sealing roller 21 briefly at end Q the strip 10" is held fast there by the clamp 32", and a new strip 10 is then taken up as the carriage 20 moves back from end Q towards end P with the sealing roller 21 lowered to bond the strip 10", i.e. exerting pressure and heat so that the strip 10" becomes bonded to the underlying strip of the stack 40 (not shown). In this way, a strip 10 or 10" is bonded into place at each traverse of the carriage 20 from end P to end Q and from end Q back to end P.

The principle of increasing the efficiency of the equipment just explained with reference to FIG. 6 can be designed even more economically in another version (not shown), in which the positioning of the strips 10 at the two ends P and Q is carried out by several position detectors 24 and positioning drives 25 mounted on each of the two sides 1 and r of the sliding carriage. When the carriage 20 moves from one end P or Q to the other Q or P, the strips 10 on one side 1, r of the carriage 20 are taken up and successively positioned and held fast at the corresponding end P, Q. As the carriage 20 then moves off while exerting pressure and if necessary an elevated temperature via the lowered sealing roller 21, the strips 10 are then bonded to the topmost strip of the stack 40. With such an arrangement of the equipment it is necessary for the sealing roller 21 to exert a sufficiently high pressure upon the stack 40 or on the overlying strips 10, and if necessary to be at a sufficiently high temperature to heat the strips 10 and the topmost strip of the stack 40 enough, to ensure that the strips 10 and the topmost strip of the stack 40 are bonded together. Moreover, with at least partially simultaneous positioning of the strips 10, some adjustment of the strips 10 under one another is necessary to ensure that the adhesive strips 6 of neighbouring strips 10 are in staggered positions.

Figure 7:
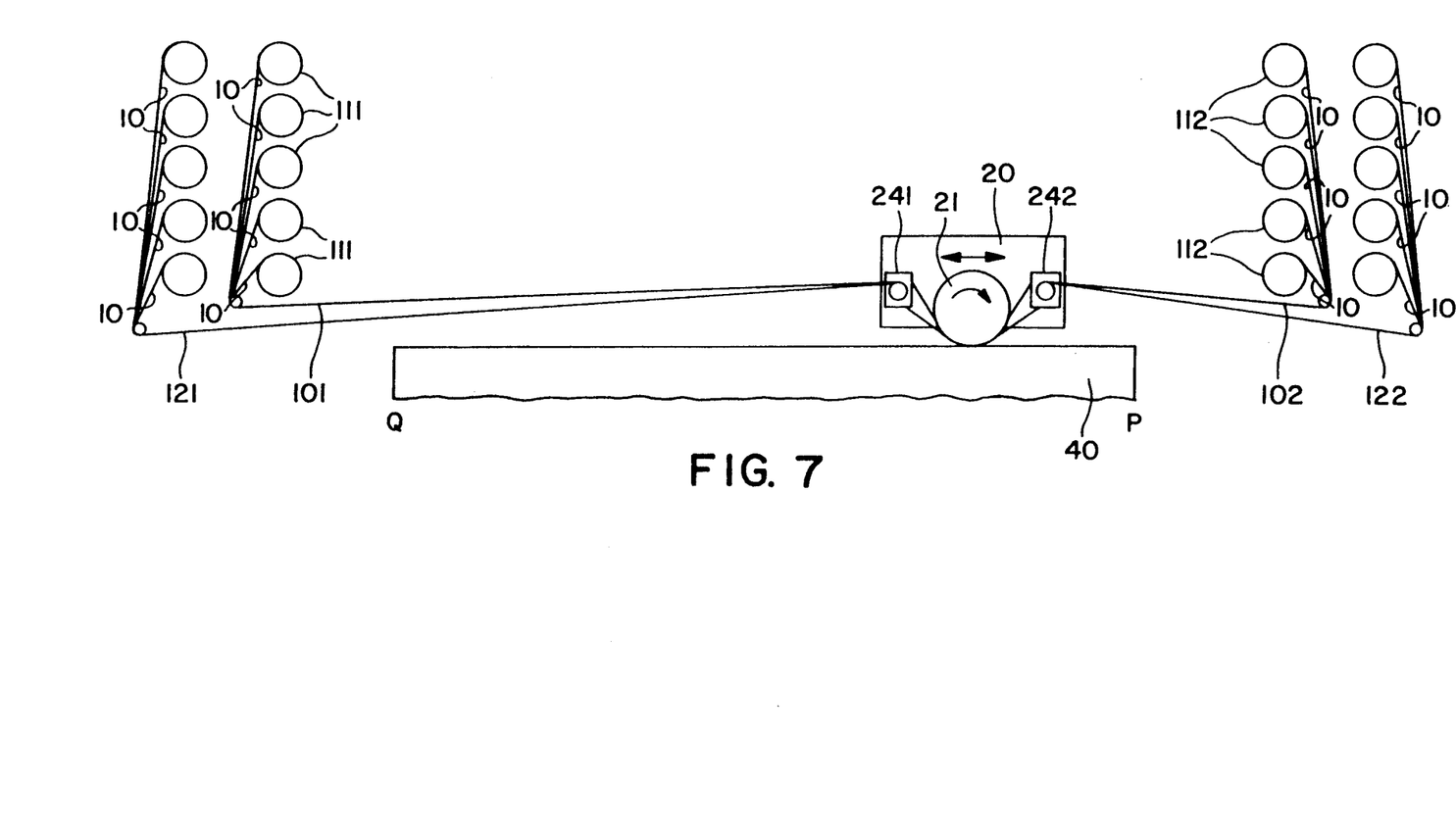

Another arrangement based upon the principle of increasing the efficiency of the equipment is shown in FIG. 7, in greatly simplified form. From a stand of strip spools 111, a first number 101 of strips 10 with a staggered arrangement of their adhesive strips 6 are led simultaneously over a position detector 241 towards the end P as the carriage 20 moves towards it, positioned, and held fast, and when the carriage 20 moves back in the direction of the other end Q a second number 102 of strips 10 with a staggered arrangement of their adhesive strips 6 are led simultaneously over a second position detector 242 towards the end Q, positioned there, and held fast. Except for the brief lifting of the sealing roller 21 to allow the positioning and clamping, the sealing roller 21 is continuously in the pressing position during the movement of the carriage, so that both the number 101 of strips 10 and the number 102 of strips become adhesively bonded to one another and to the topmost strip of the stack 40. As is also apparent from FIG. 7, a further number 121, 122 of strips 10 can again be taken respectively to the two ends P. Q in an analogous way. Obviously, the sealing roller 21 must be correspondingly equipped so that the number 101 and 121 or 102 and 122 of strips 10 and at least the topmost strip of the stack are pressed and if necessary heated sufficiently to ensure adequate adhesive bonding.

Figure 8:
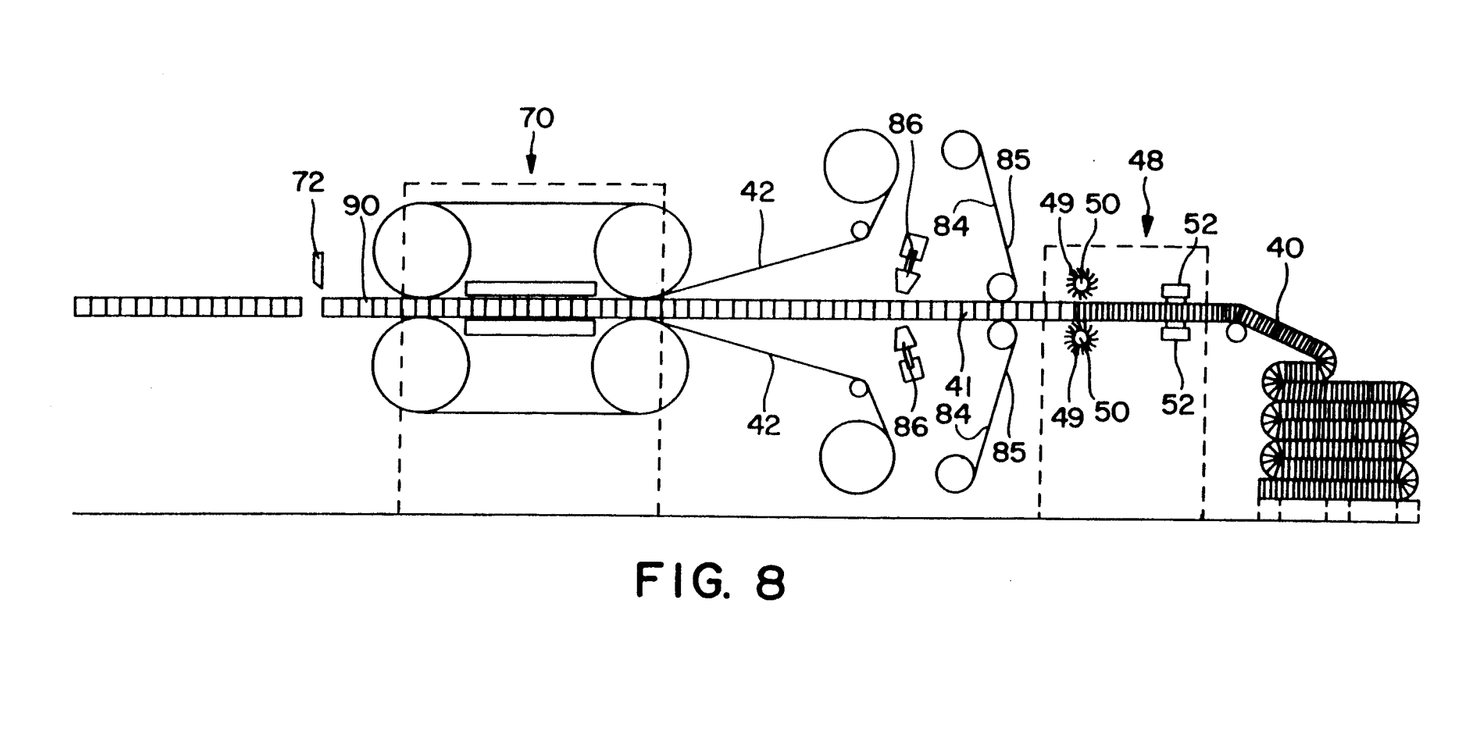

FIG. 8 illustrates the application of the stack 40 produced by the process of the invention, preferably using the equipment of the invention, for the production of a composite plate 90 with an expanded honeycomb core 41 and covering layers 42. The meander-shaped stack 40 passes through an expander device 48 consisting essentially of two rollers 50 arranged on either side of the stack 40, the surfaces of these rollers being covered with brushes 49. The brushes act on the strips of the stack 40 transversely to the stacking direction, in that a drive mechanism (not shown) carries the stack 40 past the rollers 50 at high speed as the stack leaves the honeycomb holder device 60. This can advantageously happen in a simple way since before the stack 40 is moved past the rollers 50, a restraining force acts upon it, which brakes the pulling force exerted by the drive mechanism of the rollers 50. This restraining force is exerted by a braking device 52 arranged on both sides of the stack 40, specifically by two strips of brush mounted on either side. After passing through the rollers 50 the stack 40 has been stretched to an expanded honeycomb core 41. This expanded honeycomb core 41 is covered on the front edges 82 of the honeycomb cells 80 on both sides with an adhesive, preferably in the form of adhesive foil 84, and the covering layers are laid on top of this. The sandwich consisting of the honeycomb core 41 with adhesive foils 84 on both sides and covering layers 42, especially ones made of aluminium, lying on top of these, passes into a continuous press 70 and is there bonded to form a composite plate 90. Adjustment of the running speed of the continuous press 70 and of the drive mechanism of the rollers 50 allows continuous production of the composite plate to be achieved. By appropriately slightly increasing the running speed of the continuous press 70, the expansion of the honeycomb core 41 can advantageously be supported, at least in part. For optimum preparation of the adhesive on the front edges 82 of the honeycomb cells 80, it is particularly advantageous to treat the adhesive foil 84 with a hot gaseous medium, especially hot air, after it has been positioned over the expanded honeycomb core 41, as shown in FIG. 8. This can be done simply by hot-air blowers 86 arranged on either side of the expanded honeycomb core 41. This treatment causes the adhesive foil 84 to soften or melt, so that it remains stuck only to the front edges 82 of the honeycomb cells 80. The process takes place in such a way that the adhesive foil 84 spread over the inside 81 of the honeycomb cells 80 bursts, and because of the tension in the foil 84 or the surface tension of the adhesive, draws back from the inside of the honeycomb cells 80 to their front edges 82.

The continuously fabricated composite plate 90 can be cut to the desired size by a cutting device 72, in any familiar way.

I claim:

1. Process for the production of an expanded honeycomb core which comprises: unrolling foil bands from a band coil wherein the foil bands are coated at uniform intervals with adhesive strips and cut into foil band strips in the direction of unrolling; piling the foil band strips on top of one another with their respective adhesive strips parallel but in staggered positions; thereafter adhesively bonding the foil band strips together under pressure to form a stack with first and second ends; finally expanding the stack; including the steps of cutting the foil bands into foil band strips whose width corresponds to a desired honeycomb core height; passing one of said foil band strips over an underlying foil band strip and over a position detector which, by detecting the adhesive strips determines its position relative to the first end of the stack and activates an electronic control unit to control a positioning drive and a cutting device; positioning said one foil band strip with the positioning drive relative to the stack at its first end in such a way that the adhesive strips on the said one foil band strip lie between those of the underlying foil band strip; holding the said one foil band strip fast at the first end; beginning from the first end the said one foil band strip is then progressively bonded to the underlying foil band strip working towards the direction of the second end; before bonding at the second end, the said one foil band strip is cut by the cutting device to a preselected length limited by the first and second ends which corresponds to the desired width of the honeycomb core; and repeating the process.

2. Process according to claim 1 wherein the positioning drive is mounted upon a sliding carriage movable through the entire length of the stack, wherein the carriage first moves in the direction of the first end taking with it said one foil band strip until said one foil band strip is close to the first end, while at the same time the position of the adhesive strips is determined relative to the first end; positioning the end of said one foil band strip at the first end and holding it fast at the first end; subsequently moving the carriage in the direction of the second end; exerting pressure on said one foil band strip and at least the underlying foil band strip in such a way that said one foil band strip becomes bonded to the underlying foil band strip along the entire length of the stack.

3. Process according to claim 2 wherein a first foil band strip is passed over a first position detector as the sliding carriage moves in the direction of the first end, and is positioned and then held fast, and a second foil band strip is passed over a second position detector as the carriage moves in the direction of the second end, and is positioned; and the positioned and held foil band strips are then adhesively bonded together into the underlying foil band strip.

4. Process according to claim 2 wherein a first number of foil band strips with a staggered arrangement of their adhesive strips is passed over a number of position detectors equal to or smaller than the first number of strips as the sliding carriage moves in the direction of the first end and is positioned and held fast; and a second number of foil band strips with a staggered arrangement of their adhesive strips is simultaneously passed over a second number of position detectors equal to or smaller than the second number of strips as the carriage moves in the direction of the second end, and is positioned; and wherein the positioned and held number of foil band strips are then adhesively bonded together into the underlying foil band strip.

5. Process according to claim 1 wherein several foil band strips at a time are passed over position detectors with their adhesive strips in a staggered arrangement, and are simultaneously positioned over one another, holding said foil band strips fast and adhesively bonding said foil band strips.

6. Process according to claim 1 wherein several foil band strips at a time are passed over position detectors allocated each to one foil band strip and with a staggered arrangement of their adhesive strips, simultaneously positioning said foil band strips over one another, holding said foil band strips fast and adhesively bonding said foil band strips.

7. Process according to claim 1 including the step of unrolling the foil band strips from a strip spool.

8. Process according to claim 1 including the step of using an adhesive whose reflectivity is lower than that of the foil band strip material to produce the adhesive strips.

9. Process according to claim 8 including the step of providing that the adhesive contains a dye to reduce its reflectivity.

10. Process according to claim 1 including the step of carrying out adhesive bonding at an elevated temperature.

11. Process according to claim 1 including the step of locating the adhesive strips on the foil band strips centrally between those of the underlying foil band strip.

* * * * *